Nov. 13, 1962 P. E. CAVANAGH 3,063,826
METHOD OF REDUCING IRON ORES
Filed Sept. 4, 1959 2 Sheets-Sheet 1

*Inventor*
PATRICK E. CAVANAGH
by:

Inventor
PATRICK E. CAVANAGH

United States Patent Office 3,063,826
Patented Nov. 13, 1962

3,063,826
METHOD OF REDUCING IRON ORES
Patrick Edgar Cavanagh, 320 Laird Blvd., Mount Royal, Montreal, Quebec, Canada
Filed Sept. 4, 1959, Ser. No. 838,296
2 Claims. (Cl. 75—38)

This invention relates to a divided reducing furnace construction for the reduction of iron ores with natural gas as a fuel and reducing agent and to the method of practising iron ore reduction to produce molten iron in one operation.

A publication of the American Institute of Mining and Metallurgical Engineers deals with various direct iron ore reduction processes and equipment in the journal of metals of that Institute, volume 10, No. 12, pages 804 to 809, December 1958. The iron ore to be reduced may be in the form of lump ore or sinter. The ore in some instances may be in the form of screened fines or fine concentrates. In such prior direct reduction processes the ore particles may be conveyed continuously through a reducing atmosphere or may be placed in a vessel for batch processing and in which reducing gas is caused to flow through the ore within the vessel to effect reduction thereof. The technique of causing gas to flow through a loose mass of iron ore particles has received considerable attention in recent years.

There are five main ways in which reducing gases may be caused to come into contact with iron ore particles to effect reduction of same.

In the tunnel kiln or Hoganas process the reducing agent is packed with the ore in a container and heated to reducing temperature.

In the Wiberg-Soderfors process the iron ore is fed into the top of a shaft through which reducing gas rises.

In a process practised by Hojalata y Lamina of Monterrey, Mexico, ore is charged into reduction vessel through which reducing gas is blown at reduction temperatures. This process to some extent may be regarded as a batch modification of the Wiberg-Soderfors method.

The so-called fluidized bed system has attracted considerable interest and essentially comprises passing reducing gas through a bed of fine particle ore at controlled velocities causing agitation of the particles and partial suspension of the bed during reduction. This method has been practised in a shaft type of reducing furnace as well as on a shallow bed conveyor or like configuration of equipment.

Finally there is that class of process in which particles of iron ore are caused to be entrained either in a stream of reducing gas or are caused to fall through a reducing atmosphere in a rotary kiln or other mechanical arrangemen. The recent jet smelting process of the the Ontario Research Foundation referred to in the publication noted represents that type of system in which fine particles of ore are fed within a fast moving gas stream effecting reduction of same. In such process a secondary gas inlet type of burner is utilized to which natural gas may be fed as a fuel and reducing agent along with oxygen.

The furnace construction and method of this invention takes advantage of the desirable characteristics of the prior processes outlined and obviates the main disadvantages thereof.

Excepting the above identified so-called gas entrained reduction types of processes, the main problems arising in the utilization of prior art processes centre about the clinging characteristics of the iron ore during reduction in conjunction with economy factors arising from the geometry, nature and size of the ore and nature of the fuel.

In all of the various processes outlined the control of gas composition both from the operating and commercial points of view is of marginal acceptance leading to the systems being utilized only in special situations. The reducing furnace construction of the present invention is particularly adapted for substantially complete gas utilization particularly with natural gas as the essential fuel and reducing agent as will be evident hereinafter in more detail. The details and other objects of the invention will be apparent from a study of the following specification taken in conjunction with the accompanying drawings in which one preferred construction and geometry of apparatus is illustrated for the purpose of revealing the invention and which may be subject to substantial geometric modification without departing from the spirit thereof.

Figure 1:
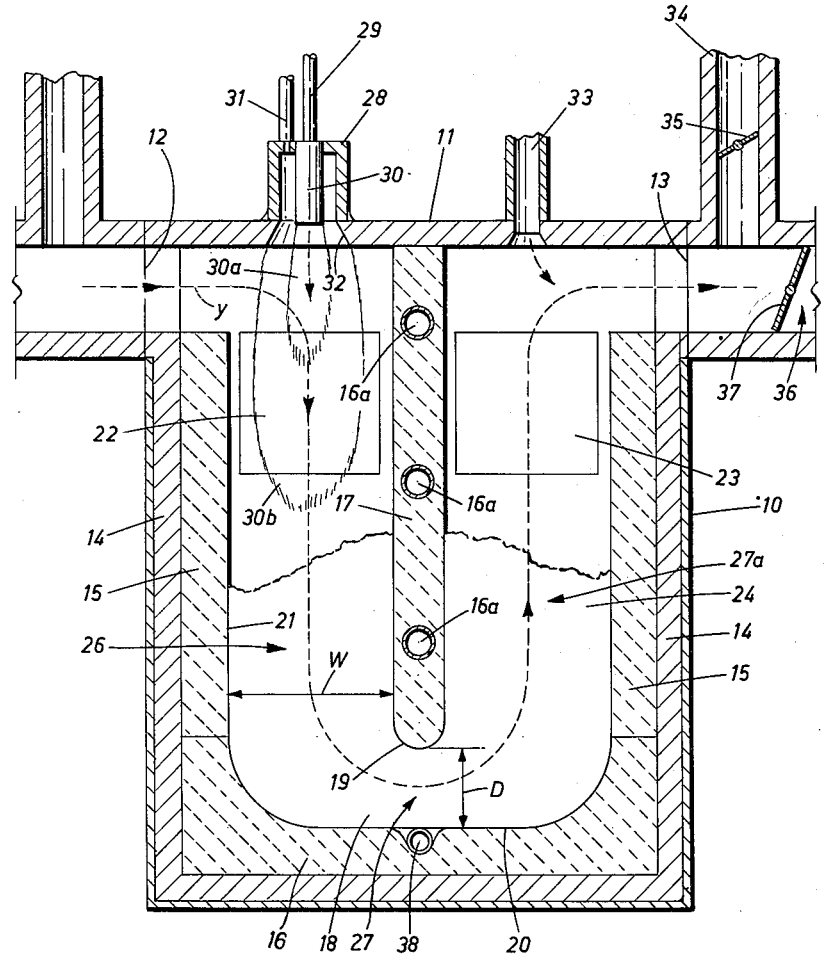
FIGURE 1 is a sectional view of the essential elements of a furnace pot construction according to the invention.

In FIGURE 1 a divided reducing pot of the invention is shown for which a sheet metal pot 10 having a cover portion 11 and gas inlet opening 12 and gas outlet opening 13 is lined with two courses 14 of insulating brick having an inner lining 15 of castable refractory. The hearth 16 is preferably formed of periclase. As an integral part of the case 10, cooling tubes 16a extend thereacross and support a dividing curtain wall 17 preferably formed of castable refractory. The cooling tubes 16a communicating cooling gas or preferably a portion or all of the reducing gases to effect preheating the latter as will be hereinafter described in more detail. Observe that the curtain wall 17 essentially substantially divides the furnace cavity 18 but is spaced at its depending terminus 19 a distance from the hearth surface 20 rendering the sectional area of the ore bed along the dimension "D," preferably slightly less than, if not equal to the sectional area of the ore bed between the curtain wall and the inner surface 21 of the lining, having regard to the inner geometry of the pot in the area of the dimension "W."

The ore is charged into the pot 10 on both sides of the curtain wall through the charging doors 22 and 23 to form an ore mass 24 of lump ore, sinter or pelletized fines. Reducing gas flow proceeds in the direction "Y" on the gas flow path 25 proceeding into the inlet opening at 12 and downwardly through the primary charging chamber 26 also termed herein the gas inlet chamber through the bottom zone 27 and up through the secondary charging chamber 27a also termed herein the gas outlet chamber to the outlet opening at 13.

Each reducing pot of the invention has associated therewith a jet type gas burner 28 comprising a primary gas inlet tube 29 expelling gas at high velocity in a primary combustion chamber 30 within which substantial combustion occurs and emits as a jet flame 30a to which in turn secondary gas is added through a secondary inlet 31 and reacts at a very high temperature (about 4000° F.) to crack the methane and produce hydrogen and carbon monoxide by reaction with the combustion products from chamber 30 thus to control the nature of the gas combustion process in the jet combustion zone 30b extending substantially between and beyond the outer forward walls 32 of this form of jet burner. Any jet gas burner providing for the entry of secondary gas is satisfactory for the purpose of the invention. However, it is preferred to utilize that form of jet gas burner described herein and used in so-called jet smelting processes. However, the fine ore to be reduced preferably is not fed with the gas stream according to the present invention. Each reducing pot also provides for a tertiary gas inlet 33 located in the secondary charging chamber adjacent the outlet gas opening 13 which latter is in controllable communication with an exhaust flue 34 having a manual closure valve 35 therefor.

Operation with a single reducing pot may be accomplished with some degree of satisfaction by communicating the secondary outlet opening 36, having a hand control valve 37 directly with the inlet opening 12 for purposes of experimental trial and some special applications for commercial purposes. Preferably, series of divided reducing pots may be arrayed for continuous gas flow in a complete furnace construction of a form disclosed in FIGURE 2. Each of the divided reducing pots will embody a taphole 38 communicating from the hearth exteriorly of the casing 10 and which may be operated in accordance with conventional tapping practise to remove molten metal from the pot upon reduction of the ore therein.

Figure 2:
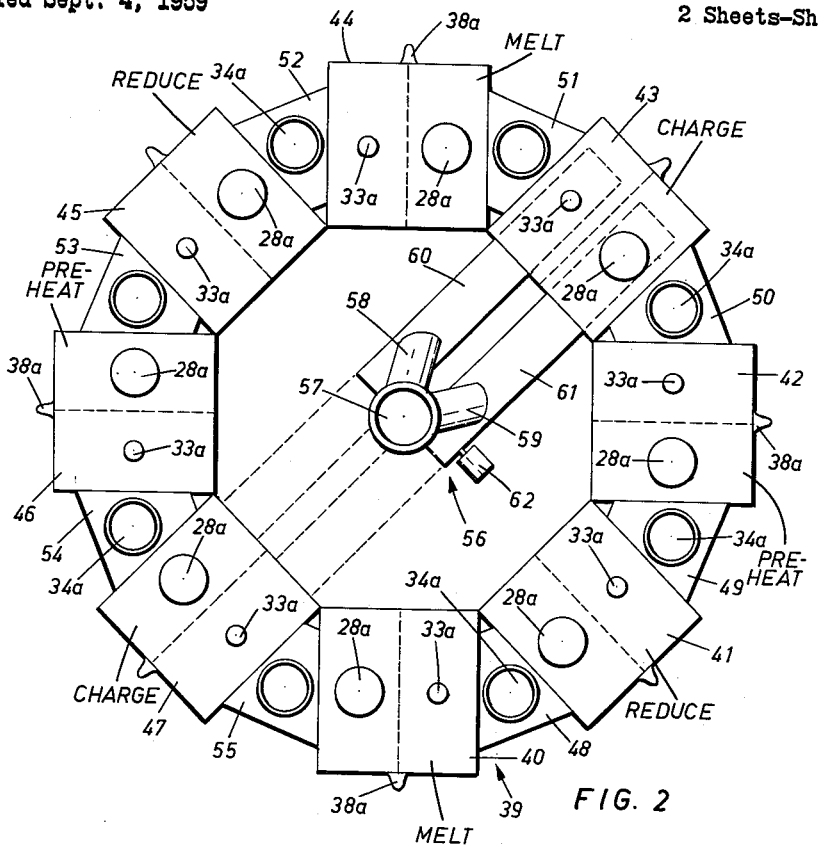
FIGURE 2 is a plan view of a complete reducing furnace according to the invention utilizing a plural series of reducing pots in multiples of four according to FIGURE 1 and communicating in a continuous gas circuit as disclosed herein.

In the furnace construction 39 shown in FIGURE 2 eight divided furnace pots 40 to 47 inclusive are shown in continuous series connected by gas communicating manifolds 48 to 55. The central charging unit 56 comprise a common charging tube 57 leading to the chutes 58 and 59 delivers ore to the loading conveyors 60 and 61. This general type of charging mechanism is known for the automatic charging of various industrial furnaces and is driven by a motor unit 62 to provide for controllable dual lateral motion of the conveyors 60 and 61 to pass into and through the charging doors 22 and 23 of FIGURE 1 to deliver ore simultaneously to the chambers 26 and 27 of a pot unit. Since the construction shown in FIGURE 2 in the preferred form provides for two simultaneous complete reducing cycle operation the conveyors are adapted to retract and extend from one pot unit to a diametrically opposed pot unit immediately thereafter. The conveyors are therefore reversible and the charging chutes 58 and 59 for delivery of ore in the direction of feed are rotatable about the delivery tube 57. In this way the charging unit 56 by remote control may serve the various pot units in turn. Each of the pot units embodies a pouring spout 38a at the taphole thereof by means of which the melt can be drawn.

As shown in actual operation two pots opposite one another would be on the melting portion of the cycle. In these pots the burner 28a would be operating to produce a temperature of about 3000 degrees F. in the bed of ore as quickly as possible to bring about melting of the metallic iron in the pot at the start of the melting circle. The gas analysis from the burner 28a should be as reducing as possible to avoid excessive oxidation of the metallic iron. Gas leaving furnaces 39 and 44 will be about 2600 degrees F. External natural gas can be added by way of the tertiary burner 33a to lower the percentage of carbon dioxide and water vapour in the gas thus to provide rich hot reducing gas through manifolds 48 and 52 to the inlet openings of the pots 41 and 45. In pots 41 and 45 the reducing cycle proceeds with a preferred gas composition of 50 to 55 percent hydrogen, 30 to 35 percent carbon monoxide and 3 to 5 percent carbon dioxide. The reducing cycle at pots 41 and 45 is run until the exit gas leaving them is approximately the same in composition as the gas entering the same from the pots 40 and 44. At this point of operation the reducing cycle will be completed in the pots 41 and 45 and they will then begin the melting cycle.

Assuming pots 40 and 44 to be at the melting stage and pots 41 and 45 at the reducing stage then pots 42 and 46 will be in a preheat portion of their cycle of operation. Gas leaving the pots 41 and 45 will be raised in temperature by operation of the burner 33a thus to raise the temperature of gas communicating by the manifolds 49 and 53 to the preheat pots 42 and 46. The purpose of the latter pots and their stage of operation is to preheat the charge of ore therein while effecting a minor amount of pre-reduction in a temperature range of about 1800 degrees F. and 2000 degrees F. Gas leaving the preheat pots is exhausted through the associated exhaust stack 34a. Such exhaust gas is at relatively high temperature and still possesses a high fuel value.

Figure 3:
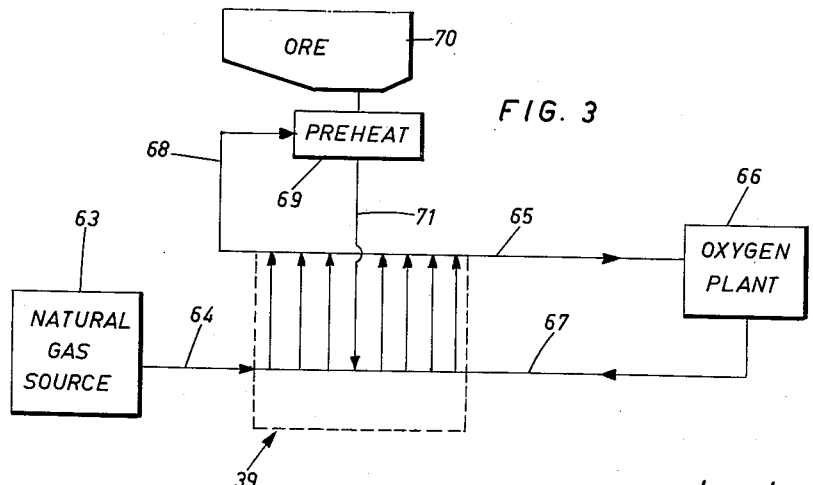
FIGURE 3 is a diagrammatic layout according to the invention illustrating ore feed and gas flow.

In the diagrammatical plan layout of FIGURE 3 the furnace construction of the invention is generally fed by a natural gas supply 63 by line 64 to the gas jet burners 28 and 33 of FIGURE 1. The exhaust gases pass to the common manifold 65 leading to an oxygen plant 66, where they may be used as fuel to drive pumps separating oxygen from air. The oxygen is returned by line 67 to the various jet burners. It is preferred that a small bleed-off of exhaust gases be provided by line 68 to a preheating zone 69 to which ore is delivered from the ore bin 70 and from which ore is charged by feed lines 71 through the central feed tube 57 of the furnace construction of FIGURE 2.

According to the invention natural gas is combusted with oxygen or enriched air in a jet burner having an inner combustion chamber as shown, and secondary gas is added to the products of combustion to produce a rich reducing gas. As shown, the construction of the furnace forces the gas to pass through the ore bed, since the cooled central partition is below the top of the ore bed. This construction provides a definite advantage over other possible ways of forcing gas through an ore bed. The invention contemplates geometry in which a central section is charged with ore and curtain walls force the gas to go to the bottom of the furnace before travelling up the outside walls of the furnace. The method herein ensures twice the gas path length for the same depth of bed, or conversely, one-half the bed depth for the same gas travel. This is an advantage in avoiding excessive pressure due to bed depth in large units.

Gas from the burner after passing through the ore bed leaves the furnace past the outlet burner. The outlet burner is used to increase the gas temperature, and/or to adjust gas analysis before it reaches the next unit in the assembly of furnaces.

Having regard to the foregoing it will be apparent that the invention concerns a reducing furnace construction in the form of a refractory lined vessel having a hearth in which a curtain wall within the vessel defines gas inlet and gas outlet chambers therein in communication each with the other over the hearth area. The gas inlet and outlet chambers are both charged with ore through ore charging openings in each chamber. A gas burner produces a reducing atmosphere at high temperature in the gas inlet chamber. Reducing gas moves through the ore from the inlet chamber below the curtain wall over the hearth and up through the ore in the gas outlet chamber.

In a form of the invention satisfactory for large tonnage output a plurality of such reduction vessels is provided and communicating series by means of gas manifolds. Each of the reducing vessels operates in a series cycle whereby ore is introduced consecutively into the vessels. Means are provided for continually treating at least a portion of the gases passing through the communicating manifolds thereby to control the reducing activity of the gases at each gas injection point in the series vessel circuit. The treated gases are re-cycled for addition to fresh reducing gas available for each vessel. The treated gases are preferably returned for addition to primary combustion products of the jet burner emitted from the combustion chamber 30 by injecting the treated gases as secondary gas through the secondary inlet 31.

The invention also concerns the method disclosed herein for producing ore in a plurality of vessels into which producing gas is introduced under pressure. The gaseous products of reduction are communicated in series from one vessel to the next effectively at the point of gas introduction to the latter. At least a portion of the gaseous products of reduction is removed from each of the vessels and the reducing qualities thereof improved. The improved gaseous products are then circulated for combining with the reducing gases injected into the vessels, thus, to control the reducing activity.

What I claim is:

1. The method of reducing a substantially pellet size ore in a plurality of closed vessels each having a gas inlet and a gas outlet in communication with an ore treating chamber and comprising the steps in combination of: arranging said vessels in a ring-like configuration for connection of gas from the outlet of one to the inlet of the next to provide a series gas circuit; obstructing the flow of gas within each vessel between the inlet and outlet thereof to direct the gas flow through the ore chamber therein; adjacent said inlet injecting oxygen and natural gas under pressure while effecting controlled combustion thereof within said vessel thereby controllably to generate a reduction gas within said vessel between said inlet and said ore chamber; adjacent said outlet controllably introducing additional natural gas thereby to control the exhaust gas composition proceeding to the next vessel in series circuit; adjusting the ratio of oxygen and natural gas for the generation of reducing gas to control the reducibility of the gas generated and the heat content thereof in different ratios in each of said vessels to accomplish different stages of reducing and melting cycles successively in said vessels; establishing a sufficient number of vessels in said series gas circuit to provide for at least simultaneous ore charging stage, ore reduction stage, ore melting stage, and melt tapping stage simultaneously in successive vessels; and interrupting the flow of exhaust gas from the vessel at the melt tapping stage to the vessel at the ore loading stage while discontinuing reducing gas generation in the latter.

2. The method as claimed in claim 1 and the steps of: feeding ore successively to said vessels from a point common to all said vessels and extracting a melt successively from said vessels at successive points circumferentially about said vessels and said point of introduction of ore.

References Cited in the file of this patent

UNITED STATES PATENTS

| | | |
|---|---|---|
| 1,461,801 | McGregor | July 17, 1923 |
| 1,549,141 | McGregor | Aug. 11, 1925 |
| 1,849,561 | Wiberg | Mar. 15, 1932 |
| 2,321,310 | Moore | June 8, 1943 |

FOREIGN PATENTS

| | | |
|---|---|---|
| 523,593 | Germany | Apr. 2, 1931 |
| 393,433 | Great Britain | June 8, 1933 |
| 524,970 | Great Britain | Aug. 19, 1940 |
| 115,301 | Australia | June 25, 1941 |
| 656,699 | Great Britain | Aug. 29, 1951 |
| 498,298 | Canada | Dec. 8, 1953 |
| 914,717 | Germany | July 8, 1954 |